United States Patent
Keith, Jr.

(10) Patent No.: US 8,811,396 B2
(45) Date of Patent: Aug. 19, 2014

(54) SYSTEM FOR AND METHOD OF SECURING A NETWORK UTILIZING CREDENTIALS

(75) Inventor: Robert O. Keith, Jr., Modesto, CA (US)

(73) Assignee: MAXSP Corporation, Sunnyvale, CA (US)

( * ) Notice: Subject to any disclaimer, the term of this patent is extended or adjusted under 35 U.S.C. 154(b) by 0 days.

(21) Appl. No.: 11/440,564

(22) Filed: May 24, 2006

(65) Prior Publication Data

US 2007/0274315 A1 Nov. 29, 2007

(51) Int. Cl.
*H04L 12/28* (2006.01)

(52) U.S. Cl.
USPC ............ 370/392; 370/231; 370/394; 370/466

(58) Field of Classification Search
None
See application file for complete search history.

(56) References Cited

U.S. PATENT DOCUMENTS

| | | | |
|---|---|---|---|
| 4,866,635 A | 9/1989 | Kahn et al. ..................... 364/513 |
| 5,602,990 A | 2/1997 | Leete ........................ 395/183.22 |
| 5,649,196 A | 7/1997 | Woodhill et al. ............. 395/620 |
| 5,659,743 A | 8/1997 | Adams et al. ................. 395/621 |
| 5,787,409 A | 7/1998 | Seiffert et al. |
| 5,802,364 A | 9/1998 | Senator et al. |
| 5,812,751 A | 9/1998 | Ekrot et al. |
| 5,835,911 A | 11/1998 | Nakagawa et al. |
| 5,897,635 A | 4/1999 | Torres et al. |
| 5,933,647 A | 8/1999 | Aronberg et al. |
| 5,950,010 A | 9/1999 | Hesse et al. |
| 5,974,547 A | 10/1999 | Klimenko ........................ 713/2 |
| 6,012,152 A | 1/2000 | Douik et al. ..................... 714/26 |
| 6,029,196 A | 2/2000 | Lenz ............................. 709/221 |
| 6,067,582 A | 5/2000 | Smith et al. |
| 6,144,959 A | 11/2000 | Anderson et al. |
| 6,170,065 B1 | 1/2001 | Kobata et al. ..................... 714/7 |
| 6,189,101 B1 | 2/2001 | Dusenbury, Jr. |
| 6,209,089 B1 | 3/2001 | Selitrennikoff et al. .......... 713/2 |
| 6,212,660 B1 | 4/2001 | Joeressen et al. ............. 714/758 |
| 6,282,711 B1 | 8/2001 | Halpern et al. |
| 6,292,827 B1 | 9/2001 | Raz ............................... 709/217 |
| 6,301,612 B1 | 10/2001 | Selitrennikoff et al. ...... 709/220 |
| 6,311,221 B1 | 10/2001 | Raz et al. ...................... 709/231 |
| 6,314,428 B1 | 11/2001 | Brew et al. |
| 6,317,761 B1 | 11/2001 | Landsman et al. ............ 707/513 |

(Continued)

FOREIGN PATENT DOCUMENTS

WO WO2005119493 A2 12/2005
WO WO2005119494 A2 12/2005

(Continued)

OTHER PUBLICATIONS http://www.backup.com.

(Continued)

*Primary Examiner* — Duc C Ho
(74) *Attorney, Agent, or Firm* — Haverstock & Owens, LLP

(57) ABSTRACT

A system for and method of securing a network are described herein. A receiving device listens for packets with proper credentials. If a transmitting device sends the correct credentials, the receiving device will respond with an acknowledgment and further data is able to be transmitted. However, if the transmitting device does not send a packet with the proper credentials, then the receiving device will drop the packet and not respond. Thus, the transmitting device will be unaware of the presence of the receiving device, in particular when hackers are using scanning software to locate target devices.

37 Claims, 4 Drawing Sheets

(56) References Cited

U.S. PATENT DOCUMENTS

| | | | |
|---|---|---|---|
| 6,339,826 B2 | 1/2002 | Hayes, Jr. et al. | |
| 6,349,137 B1 | 2/2002 | Hunt et al. | |
| 6,356,915 B1 | 3/2002 | Chtchetkine et al. | 707/200 |
| 6,363,400 B1 | 3/2002 | Chtchetkine et al. | 707/200 |
| 6,366,296 B1 | 4/2002 | Boreczky et al. | 345/719 |
| 6,378,035 B1 | 4/2002 | Parry et al. | 711/110 |
| 6,421,777 B1 | 7/2002 | Pierre-Louis et al. | 713/2 |
| 6,449,658 B1 | 9/2002 | Lafe et al. | 709/247 |
| 6,459,499 B1 | 10/2002 | Tomat | |
| 6,463,530 B1 | 10/2002 | Sposato | 713/2 |
| 6,473,794 B1 | 10/2002 | Guheen et al. | 709/223 |
| 6,477,531 B1 | 11/2002 | Sullivan et al. | |
| 6,490,677 B1 | 12/2002 | Aquilar et al. | 713/1 |
| 6,536,037 B1 | 3/2003 | Guheen et al. | 717/151 |
| 6,553,375 B1 | 4/2003 | Huang et al. | |
| 6,556,950 B1 | 4/2003 | Schwenke et al. | 702/183 |
| 6,574,618 B2 | 6/2003 | Eylon et al. | 707/1 |
| 6,578,142 B1 | 6/2003 | Anderson et al. | |
| 6,606,744 B1 | 8/2003 | Mikurak | 717/174 |
| 6,625,651 B1 | 9/2003 | Swartz et al. | |
| 6,625,754 B1 | 9/2003 | Aguilar et al. | |
| 6,633,782 B1 | 10/2003 | Schleiss et al. | |
| 6,636,857 B2 | 10/2003 | Thomas et al. | 707/10 |
| 6,654,797 B1 | 11/2003 | Kamper | 709/220 |
| 6,654,801 B2 | 11/2003 | Mann et al. | |
| 6,694,375 B1 | 2/2004 | Beddus et al. | 709/249 |
| 6,697,852 B1 | 2/2004 | Ryu | |
| 6,704,886 B1 | 3/2004 | Gill et al. | |
| 6,718,464 B2 | 4/2004 | Cromer et al. | 713/2 |
| 6,728,530 B1 | 4/2004 | Heinonen et al. | |
| 6,735,625 B1 | 5/2004 | Ponna | 709/223 |
| 6,751,658 B1 | 6/2004 | Haun et al. | 709/222 |
| 6,757,729 B1 | 6/2004 | Devarakonda et al. | |
| 6,757,894 B2 | 6/2004 | Eylon et al. | 717/177 |
| 6,795,912 B1 | 9/2004 | Itoh et al. | |
| 6,816,462 B1 | 11/2004 | Booth, III et al. | 370/248 |
| 6,816,882 B1 | 11/2004 | Conner et al. | |
| 6,820,180 B2 | 11/2004 | McBrearty et al. | |
| 6,854,009 B1 | 2/2005 | Hughes | |
| 6,871,210 B1 | 3/2005 | Subramanian | 709/203 |
| 6,880,108 B1 | 4/2005 | Gusler et al. | |
| 6,885,481 B1 | 4/2005 | Dawe | |
| 6,886,020 B1 | 4/2005 | Zahavi et al. | 707/204 |
| 6,915,343 B1 | 7/2005 | Brewer et al. | 709/224 |
| 6,954,853 B2 | 10/2005 | Wang et al. | |
| 6,954,930 B2 | 10/2005 | Drake et al. | |
| 6,959,235 B1 | 10/2005 | Abdel-Malek et al. | |
| 6,985,967 B1 | 1/2006 | Hipp | |
| 7,003,560 B1 | 2/2006 | Mullen et al. | |
| 7,003,663 B2 | 2/2006 | Lagosanto et al. | |
| 7,024,471 B2 | 4/2006 | George et al. | |
| 7,058,698 B2 | 6/2006 | Chatterjee et al. | |
| 7,080,118 B2 | 7/2006 | Hildebrand | |
| 7,143,307 B1 | 11/2006 | Witte et al. | |
| 7,149,698 B2 | 12/2006 | Guheen et al. | |
| 7,175,078 B2 | 2/2007 | Ban et al. | |
| 7,178,166 B1 | 2/2007 | Taylor et al. | |
| 7,194,445 B2 | 3/2007 | Chan et al. | |
| 7,200,779 B1 | 4/2007 | Coss, Jr. et al. | |
| 7,210,143 B2 | 4/2007 | Or et al. | |
| 7,237,122 B2 | 6/2007 | Kadam et al. | |
| 7,260,597 B1 | 8/2007 | Hofrichter et al. | |
| 7,287,053 B2 | 10/2007 | Bodin | |
| 7,328,367 B2 | 2/2008 | Ukai et al. | |
| 7,337,311 B2 | 2/2008 | Chen et al. | |
| 7,392,046 B2 | 6/2008 | Leib et al. | |
| 7,401,125 B1 | 7/2008 | Uchida et al. | |
| 7,480,822 B1 | 1/2009 | Arbon et al. | |
| 7,487,383 B2 | 2/2009 | Bensinger | |
| 7,512,584 B2 | 3/2009 | Keith, Jr. | |
| 7,571,467 B1 * | 8/2009 | Priestley et al. | 726/6 |
| 7,624,086 B2 | 11/2009 | Keith, Jr. | |
| 7,627,694 B2 | 12/2009 | Sreenivasan et al. | |
| 7,664,834 B2 | 2/2010 | Keith, Jr. | |
| 7,698,487 B2 | 4/2010 | Rothman et al. | |
| 7,752,486 B2 | 7/2010 | Satran et al. | |
| 7,788,524 B2 | 8/2010 | Wing et al. | |
| 7,840,514 B2 | 11/2010 | Keith, Jr. | |
| 7,844,686 B1 | 11/2010 | Keith, Jr. | |
| 7,886,031 B1 | 2/2011 | Taylor et al. | |
| 7,908,339 B2 | 3/2011 | Keith, Jr. | |
| 7,912,902 B2 | 3/2011 | Cheng et al. | |
| 8,099,378 B2 | 1/2012 | Keith, Jr. | |
| 8,126,722 B2 | 2/2012 | Robb et al. | |
| 8,175,418 B1 | 5/2012 | Keith, Jr. | |
| 8,234,238 B2 | 7/2012 | Keith, Jr. | |
| 8,307,239 B1 | 11/2012 | Keith, Jr. | |
| 8,423,821 B1 | 4/2013 | Keith, Jr. | |
| 2001/0034736 A1 | 10/2001 | Eylon et al. | 707/200 |
| 2001/0037323 A1 | 11/2001 | Moulton et al. | 707/1 |
| 2001/0037399 A1 | 11/2001 | Eylon et al. | 709/231 |
| 2001/0037400 A1 | 11/2001 | Raz et al. | 709/232 |
| 2001/0044850 A1 | 11/2001 | Raz et al. | 709/231 |
| 2001/0049793 A1 | 12/2001 | Sugimoto | 713/200 |
| 2002/0007418 A1 | 1/2002 | Hegde et al. | 709/231 |
| 2002/0013827 A1 | 1/2002 | Edstrom et al. | |
| 2002/0035674 A1 | 3/2002 | Vetrivelkumaran et al. | |
| 2002/0042833 A1 | 4/2002 | Hendler et al. | 709/231 |
| 2002/0049764 A1 | 4/2002 | Boothby et al. | 707/100 |
| 2002/0083183 A1 | 6/2002 | Pujare et al. | 709/231 |
| 2002/0087625 A1 | 7/2002 | Toll et al. | |
| 2002/0087717 A1 | 7/2002 | Artzi et al. | 709/236 |
| 2002/0087883 A1 | 7/2002 | Wohlgemuth et al. | 713/201 |
| 2002/0087963 A1 | 7/2002 | Eylon et al. | 717/174 |
| 2002/0091763 A1 | 7/2002 | Shah et al. | 709/203 |
| 2002/0094868 A1 | 7/2002 | Tuck et al. | |
| 2002/0099934 A1 | 7/2002 | Cromer et al. | |
| 2002/0104080 A1 | 8/2002 | Woodard et al. | |
| 2002/0107920 A1 | 8/2002 | Hotti | |
| 2002/0107945 A1 | 8/2002 | George et al. | |
| 2002/0116585 A1 | 8/2002 | Scherr | 711/133 |
| 2002/0124092 A1 | 9/2002 | Urien | 709/229 |
| 2002/0129089 A1 | 9/2002 | Hegde et al. | 709/200 |
| 2002/0131404 A1 | 9/2002 | Mehta et al. | |
| 2002/0138640 A1 | 9/2002 | Raz et al. | 709/231 |
| 2002/0157089 A1 | 10/2002 | Patel et al. | 717/178 |
| 2002/0161868 A1 | 10/2002 | Paul et al. | 709/221 |
| 2002/0161908 A1 | 10/2002 | Benitez et al. | 709/231 |
| 2002/0169797 A1 | 11/2002 | Hegde et al. | 707/500.1 |
| 2002/0188941 A1 | 12/2002 | Cicciarelli et al. | |
| 2003/0004882 A1 | 1/2003 | Holler et al. | 705/51 |
| 2003/0005096 A1 | 1/2003 | Paul et al. | 709/222 |
| 2003/0009538 A1 | 1/2003 | Shah et al. | 709/219 |
| 2003/0014470 A1 | 1/2003 | Iijima | |
| 2003/0031164 A1 | 2/2003 | Nabkel et al. | |
| 2003/0033379 A1 | 2/2003 | Civanlar et al. | 709/218 |
| 2003/0036882 A1 | 2/2003 | Harper et al. | |
| 2003/0037328 A1 | 2/2003 | Cicciarelli et al. | |
| 2003/0041136 A1 | 2/2003 | Cheline et al. | 709/223 |
| 2003/0046371 A1 | 3/2003 | Falkner | |
| 2003/0051128 A1 | 3/2003 | Rodriguez et al. | 713/100 |
| 2003/0055878 A1 | 3/2003 | Fletcher et al. | |
| 2003/0061067 A1 | 3/2003 | Atwal et al. | |
| 2003/0078960 A1 | 4/2003 | Murren et al. | |
| 2003/0110188 A1 | 6/2003 | Howard et al. | |
| 2003/0120502 A1 | 6/2003 | Robb et al. | |
| 2003/0126242 A1 | 7/2003 | Chang | 709/222 |
| 2003/0140160 A1 | 7/2003 | Raz et al. | 709/231 |
| 2003/0177381 A1 * | 9/2003 | Ofek et al. | 713/200 |
| 2003/0191730 A1 | 10/2003 | Adkins et al. | |
| 2003/0204562 A1 | 10/2003 | Hwang | |
| 2003/0233383 A1 | 12/2003 | Koskimies | |
| 2003/0233493 A1 | 12/2003 | Boldon et al. | |
| 2004/0010716 A1 | 1/2004 | Childress et al. | |
| 2004/0068554 A1 | 4/2004 | Bales et al. | |
| 2004/0073787 A1 | 4/2004 | Ban et al. | |
| 2004/0093492 A1 | 5/2004 | Daude et al. | 713/156 |
| 2004/0104927 A1 | 6/2004 | Husain et al. | |
| 2004/0107273 A1 | 6/2004 | Biran et al. | |
| 2004/0123153 A1 | 6/2004 | Wright et al. | 713/201 |
| 2004/0128346 A1 | 7/2004 | Melamed et al. | 709/203 |
| 2004/0148306 A1 | 7/2004 | Moulton et al. | 707/101 |
| 2004/0180721 A1 | 9/2004 | Rowe | |
| 2004/0193876 A1 * | 9/2004 | Donley et al. | 713/162 |

(56) References Cited

U.S. PATENT DOCUMENTS

| | | | |
|---|---|---|---|
| 2004/0201604 A1 | 10/2004 | Kraenzel et al. | 345/700 |
| 2004/0236843 A1 | 11/2004 | Wing et al. | 709/219 |
| 2004/0243650 A1 | 12/2004 | McCrory et al. | |
| 2004/0243928 A1 | 12/2004 | Hesmer et al. | |
| 2005/0027846 A1 | 2/2005 | Wolfe et al. | |
| 2005/0033808 A1 | 2/2005 | Cheng et al. | |
| 2005/0044197 A1 | 2/2005 | Lai | |
| 2005/0044544 A1 | 2/2005 | Slivka et al. | |
| 2005/0060281 A1 | 3/2005 | Bucher et al. | |
| 2005/0071267 A1 | 3/2005 | Takahashi et al. | |
| 2005/0096920 A1 | 5/2005 | Matz et al. | |
| 2005/0108297 A1 | 5/2005 | Rollin et al. | |
| 2005/0108546 A1* | 5/2005 | Lehew et al. | 713/182 |
| 2005/0108593 A1 | 5/2005 | Purushothaman et al. | |
| 2005/0144218 A1 | 6/2005 | Heintz | 709/202 |
| 2005/0149729 A1 | 7/2005 | Zimmer et al. | 713/168 |
| 2005/0160289 A1* | 7/2005 | Shay | 713/201 |
| 2005/0188315 A1 | 8/2005 | Campbell et al. | |
| 2005/0193245 A1 | 9/2005 | Hayden et al. | |
| 2005/0198196 A1 | 9/2005 | Bohn et al. | |
| 2005/0198239 A1 | 9/2005 | Hughes | |
| 2005/0216524 A1 | 9/2005 | Gomes et al. | |
| 2005/0216902 A1 | 9/2005 | Schaefer | |
| 2005/0226059 A1 | 10/2005 | Kavuri et al. | |
| 2005/0256952 A1 | 11/2005 | Mouhanna et al. | |
| 2005/0262503 A1 | 11/2005 | Kane | |
| 2005/0268145 A1 | 12/2005 | Hufferd et al. | |
| 2005/0273486 A1 | 12/2005 | Keith, Jr. | |
| 2005/0283606 A1 | 12/2005 | Williams | 713/166 |
| 2005/0286435 A1 | 12/2005 | Ogawa et al. | |
| 2006/0021040 A1* | 1/2006 | Boulanger et al. | 726/23 |
| 2006/0031377 A1 | 2/2006 | Ng et al. | |
| 2006/0031407 A1 | 2/2006 | Dispensa et al. | |
| 2006/0031529 A1 | 2/2006 | Keith, Jr. | |
| 2006/0035713 A1 | 2/2006 | Cockerille et al. | |
| 2006/0041641 A1 | 2/2006 | Breiter et al. | |
| 2006/0041759 A1 | 2/2006 | Kaliski, Jr. et al. | |
| 2006/0047716 A1 | 3/2006 | Keith, Jr. | |
| 2006/0047946 A1 | 3/2006 | Keith, Jr. | |
| 2006/0059384 A1 | 3/2006 | Helliker | |
| 2006/0074943 A1 | 4/2006 | Nakano et al. | |
| 2006/0095705 A1 | 5/2006 | Wichelman et al. | 711/171 |
| 2006/0129459 A1 | 6/2006 | Mendelsohn | |
| 2006/0143709 A1* | 6/2006 | Brooks et al. | 726/23 |
| 2006/0149955 A1 | 7/2006 | Velhal et al. | |
| 2006/0179061 A1 | 8/2006 | D'Souza et al. | |
| 2006/0224544 A1 | 10/2006 | Keith, Jr. | |
| 2006/0224545 A1 | 10/2006 | Keith, Jr. | |
| 2006/0233310 A1 | 10/2006 | Adams, Jr. et al. | |
| 2007/0011292 A1 | 1/2007 | Fritsch et al. | |
| 2007/0078982 A1 | 4/2007 | Aidun et al. | |
| 2007/0094269 A1 | 4/2007 | Mikesell et al. | |
| 2007/0143374 A1 | 6/2007 | D'Souza et al. | |
| 2007/0174658 A1 | 7/2007 | Takamoto et al. | |
| 2007/0174690 A1 | 7/2007 | Kambara et al. | |
| 2007/0185936 A1 | 8/2007 | Derk et al. | |
| 2007/0233633 A1 | 10/2007 | Keith, Jr. | |
| 2007/0239905 A1 | 10/2007 | Banerjee et al. | 710/22 |
| 2007/0255604 A1 | 11/2007 | Seelig | |
| 2007/0271290 A1 | 11/2007 | Keith, Jr. | 707/101 |
| 2007/0271428 A1 | 11/2007 | Alturi | |
| 2007/0274315 A1 | 11/2007 | Keith, Jr. | |
| 2007/0276836 A1 | 11/2007 | Chatterjee et al. | |
| 2008/0016387 A1 | 1/2008 | Bensinger | |
| 2008/0034019 A1 | 2/2008 | Cisler et al. | |
| 2008/0034071 A1 | 2/2008 | Wilkinson et al. | |
| 2008/0072002 A1 | 3/2008 | Kuwahara et al. | |
| 2008/0077622 A1 | 3/2008 | Keith, Jr. | |
| 2008/0077630 A1 | 3/2008 | Keith, Jr. | |
| 2008/0127294 A1 | 5/2008 | Keith, Jr. | |
| 2008/0209142 A1 | 8/2008 | Obernuefemann | |
| 2008/0216168 A1* | 9/2008 | Larson et al. | 726/15 |
| 2008/0294860 A1 | 11/2008 | Stakutis et al. | |
| 2008/0313632 A1 | 12/2008 | Kumar et al. | |
| 2009/0075593 A1 | 3/2009 | Demirbasa et al. | |
| 2009/0094362 A1 | 4/2009 | Huff | |
| 2010/0050011 A1 | 2/2010 | Takamoto et al. | |
| 2010/0125770 A1 | 5/2010 | Keith, Jr. | |
| 2011/0047118 A1 | 2/2011 | Keith, Jr. | |
| 2012/0198154 A1 | 8/2012 | Keith, Jr. | |
| 2012/0272099 A1 | 10/2012 | Keith, Jr. | |
| 2013/0031405 A1 | 1/2013 | Keith, Jr. | |

FOREIGN PATENT DOCUMENTS

| | | |
|---|---|---|
| WO | WO2005119495 A2 | 12/2005 |
| WO | WO2006010131 A2 | 1/2006 |
| WO | WO2006094282 A2 | 9/2006 |
| WO | WO2006094301 A2 | 9/2006 |
| WO | WO2007139962 A2 | 12/2007 |
| WO | WO2007139963 A2 | 12/2007 |
| WO | WO2008039386 A2 | 4/2008 |
| WO | WO2008039394 A2 | 4/2008 |
| WO | WO2008039395 A2 | 4/2008 |

OTHER PUBLICATIONS http://www.swapdrive.com/sdbackup.asp.
http://www.macrovision.com/products/flexnet_installshield/installshield/overview/index.shtml, pp. 1-3.
http://macrovision.com/products/flexnet_installshield/installshield/index.shtml, pp. 1-2.
http://www.stealthbits.com/, pp. 1-2.
http://www.microsoft.com/technet/prodtechnol/windows2000serv/maintain/featusability/inmnwp.mspx, pp. 1-36.
http://en.wikipedia.org/wik/Expert_system, pp. 1-9.
http://www.pctools.com/registry-mechanic/, pp. 1-2.
IEEE100 The Authoritative Dictionary of IEEE Standards Terms, Seventh Edition, Jan. 2003, 3 pages.
VMware, VMware Infrastructure Architecture Overview, Jun. 14, 2006, http:/www.vmware.com/resourse/techresources/, pp. 1-14.
VMware, Using VMware Infrastructure for Backup and Restore, Oct. 26, 2006, http:/www.vmware.com/resourse/techresources/, pp. 1-20.
Bandwidth Capping at Source http://www.24onlinebilling.com/download/whitepapers/Bandwidth%20Capping%20At%20Source.pdf pp. 1-9.
IBM Corporation, AFS: "User Guide", First Edition, Version 3.6. Apr. 2000, pp. 112.
Shepler et al. "RFC 3530—Network File System (NFS) version 4 Protocol", Standards Track, Apr. 2003, pp. 278, http://tools.ietf.org/html/rfc3530#page-119.
Microsoft@ Computer Dictionary, Fifth Edition, 2002, 3 pages.
Tridgell, A., "Efficient Algorithms for Sorting and Synchronization," Thesis, The Australian National University, Feb. 1999, 106 pages.
MacDonald, J.P., "File System Support for Delta Compression," University of California at Berkeley, Dept. of Electrical Engineering and Computer Sciences, May 19, 2000, 32 pages.
Muthitacharoen et al., "A Low-bandwidth Network File System," MIT Laboratory for Computer Science and NYU Department of Computer Science, 2001, 14 pages.
Random House Unabridged Dictionary, "device: meaning and definitions," 1997, Random House Inc., retrieved via "http://dictionary.infoplease.com/device".
Yu et al., "Scalable network resource management for large scale Virtual Private Networks," Simulation Modeling Practice and Theory, 12 (2004) pp. 263-285.
Cisco PIX "Configuring an IPSec Tunnel Between a Cisco Secure PIX Firewall and a Checkpoint NG Firewall," May 12, 2006, document ID 23785.
Microsoft Press, Microsoft® Computer Dictionary, Fifth Edition, May 1, 2002, p. 39.
Definition of Plug-in (computing) from http://en.wikipedia.org/wiki/Plug-in_(computing), printed on Jun. 18, 2011, 1 page.
Plug-in definition from Wikipedia, http://en.wikipedia.org/wiki/Plug-in_(computing) printed Nov. 6, 2011, 5 pages.

* cited by examiner

SYSTEM FOR AND METHOD OF SECURING A NETWORK UTILIZING CREDENTIALS

FIELD OF THE INVENTION

The present invention relates to the field of networking. More specifically, the present invention relates to the field of providing security to a network.

BACKGROUND OF THE INVENTION

Transmission Control Protocol (TCP) allows applications on networked computers to generate connections to each other. Over these connections, the applications are then able to exchange data packets. Many applications such as the world wide web and email utilize TCP. TCP is reliable and guarantees in-order delivery of data.

Applications send streams of 8-bit bytes to TCP to be delivered through the network. TCP divides the byte stream into appropriately sized segments and then passes the resulting packets to the Internet Protocol (IP) for delivery through the network to a TCP module of a target computer on the network. TCP ensures that no packets are lost by assigning a sequence number to each packet. This sequence number also ensures the packets are delivered in the correct order. The TCP module of the target computer sends back an acknowledgment for packets which have been successfully received. If an acknowledgment is not received within a reasonable amount of time, a timeout is triggered on the transmitting computer. Then, the data packet is re-sent.

As briefly described above, a 3-way handshake is implemented to establish a TCP connection. The transmitting computer first sends a synchronization packet to initiate the connection. Then the target computer sends an acknowledgment packet back. Finally, the transmitting computer sends an acknowledgment back to the target. By utilizing a 3-way handshake, computers are able to verify their connection.

The concern with TCP is that hackers are able to utilize this 3-way handshake to locate future victims to be hacked. Using scanning software, a set of packets are sent out across the network. Any clients on the network will respond to these packets. Then, hackers are able to determine which computers are accessible on the network and which ports are open on those computers. Using that information, a hacker is able to abuse the computer by crashing it or performing other malicious activity with it such as stealing data.

User Datagram Protocol (UDP) is a connectionless protocol that allows applications on networked computers to send short messages known as datagrams to each other. Unlike TCP, UDP does not provide guaranteed reliability. Datagrams are able to arrive disordered or get lost without notice. The reason for this is that UDP does not utilize the 3-way handshake of TCP where a target computer acknowledges that it is present when an unknown transmitting computer sends an initiating connection. However, as mentioned above, UDP has a number of drawbacks including being unreliable, not ordered, and other issues that make UDP insufficient for a specified purpose.

SUMMARY OF THE INVENTION

A system for and method of securing a network are described herein. A receiving device listens for packets with proper credentials. If a transmitting device sends the correct credentials, the receiving device will respond with an acknowledgment and further data is able to be transmitted. However, if the transmitting device does not send a packet with the proper credentials, then the receiving device will drop the packet and not respond. Thus, the transmitting device will be unaware of the presence of the receiving device, in particular when hackers are using scanning software to locate target devices.

In one aspect, a method of increasing network security comprises transmitting a packet from a first device to a second device, receiving a packet at the second device from the first device, verifying the packet for proper credentials and sending an acknowledgment from the second device to the first device only if the proper credentials are verified. The first device is a client and the second device is a server. Alternatively, the first device is a server and the second device is a client. The method further comprises dropping the packet if the proper credentials are not verified. A protocol for receiving the packet is similar to or the same as User Datagram Protocol. A protocol for sending an acknowledgment is similar to or the same as Transmission Control Protocol. The first device and the second device are coupled by a network. In one embodiment, the network is the Internet. In another embodiment, the network is an intranet.

In another aspect, a method of increasing network security comprises transmitting a packet from a first device to a second device, receiving a packet at the second device from the first device, verifying the packet for proper credentials, sending an acknowledgment from the second device to the first device only if the proper credentials are verified and dropping the packet if the proper credentials are not verified. The first device is a client and the second device is a server. Alternatively, the first device is a server and the second device is a client. A protocol for receiving the packet is similar to or the same as User Datagram Protocol. A protocol for sending an acknowledgment is similar to or the same as Transmission Control Protocol. The first device and the second device are coupled by a network. In one embodiment, the network is the Internet. In another embodiment, the network is an intranet.

In yet another aspect, a system for increasing network security comprises one or more first devices for transmitting a packet, one or more second devices for receiving the packet, wherein the one or more second devices are coupled to the one or more first devices through a network and a set of credentials within the packet for verification, wherein the one or more second devices send an acknowledgment back to the one or more first devices only if the set of credentials are verified. The first device is a client and the second device is a server. Alternatively, the first device is a server and the second device is a client. The one or more second devices drop the packet if the set of credentials are not verified. A protocol for receiving the packet is similar to or the same as User Datagram Protocol. A protocol for sending an acknowledgment is similar to or the same as Transmission Control Protocol. In one embodiment, the network is the Internet. In another embodiment, the network is an intranet.

In another aspect, a network of devices for increasing network security comprises one or more client devices for transmitting a packet, one or more server devices for receiving the packet, wherein the one or more server devices are coupled to the one or more client devices through a network and a set of credentials within the packet for verification, wherein the one or more server devices send an acknowledgment back to the one or more client devices only if the set of credentials are verified. The one or more server devices drop the packet if the set of credentials are not verified. A protocol for receiving the packet is similar to or the same as User Datagram Protocol. A protocol for sending an acknowledgment is similar to or the same as Transmission Control Protocol. In one embodiment, the network is the Internet. In another embodiment, the network is an intranet.

In yet another aspect, a packet for increasing network security comprises data and a set of credentials, wherein the set of credentials are analyzed by a receiving device such that the receiving device sends an acknowledgment back only if the set of credentials are valid. The set of credentials are selected from the group consisting of a key, a code and a signature. The set of credentials are stored within a header. Alternatively, the set of credentials are stored within a wrapper. The set of credentials are encrypted. The packet is substantially similar to a User Datagram Protocol packet.

DETAILED DESCRIPTION OF THE PREFERRED EMBODIMENT

The present invention overcomes the issues described above by using a combination of elements of User Datagram Protocol (UDP) and Transmission Control Protocol (TCP) in addition to modifications of each. Using these modifications, a connection is established by only those properly authenticated devices. Furthermore, a target device remains hidden and anonymous to those devices that are not properly authenticated.

Figure 1:
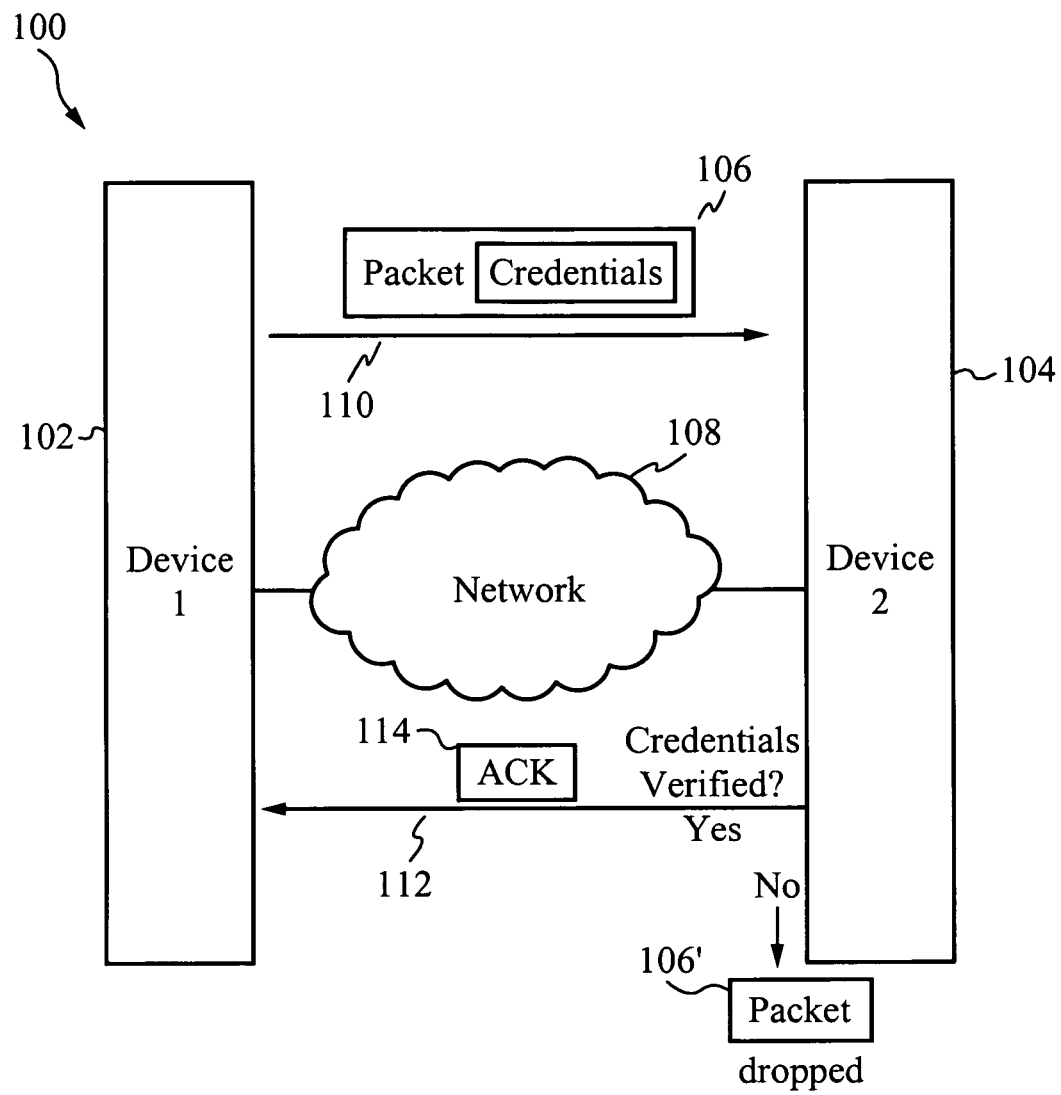
FIG. 1 illustrates a block diagram of the preferred embodiment of the present invention.

FIG. 1 illustrates a block diagram of the preferred embodiment of the present invention. A system 100 for securely networking devices includes one or more first devices 102 and one or more second devices 104. A device of the one or more first devices 102 sends a packet 106 with credentials to a device of the one or more second devices 104 over a network 108. The packet is sent using a protocol 110 such as UDP or a similar protocol. The device of the one or more second devices 104 is listening to the specified protocol. If a packet 106' does not have the correct credentials then the packet 106' is dropped and no response is sent from the device of the one or more second devices 104. If the credentials are validly verified, then an acknowledgment 114 is sent from the device of the one or more second devices 104 over the network 108 to the device of the one or more first devices 102. The acknowledgment 114 is sent over a protocol 112 such as TCP, UDP or a similar protocol. After the initial connection is established, data is communicated between the devices.

Figure 2:
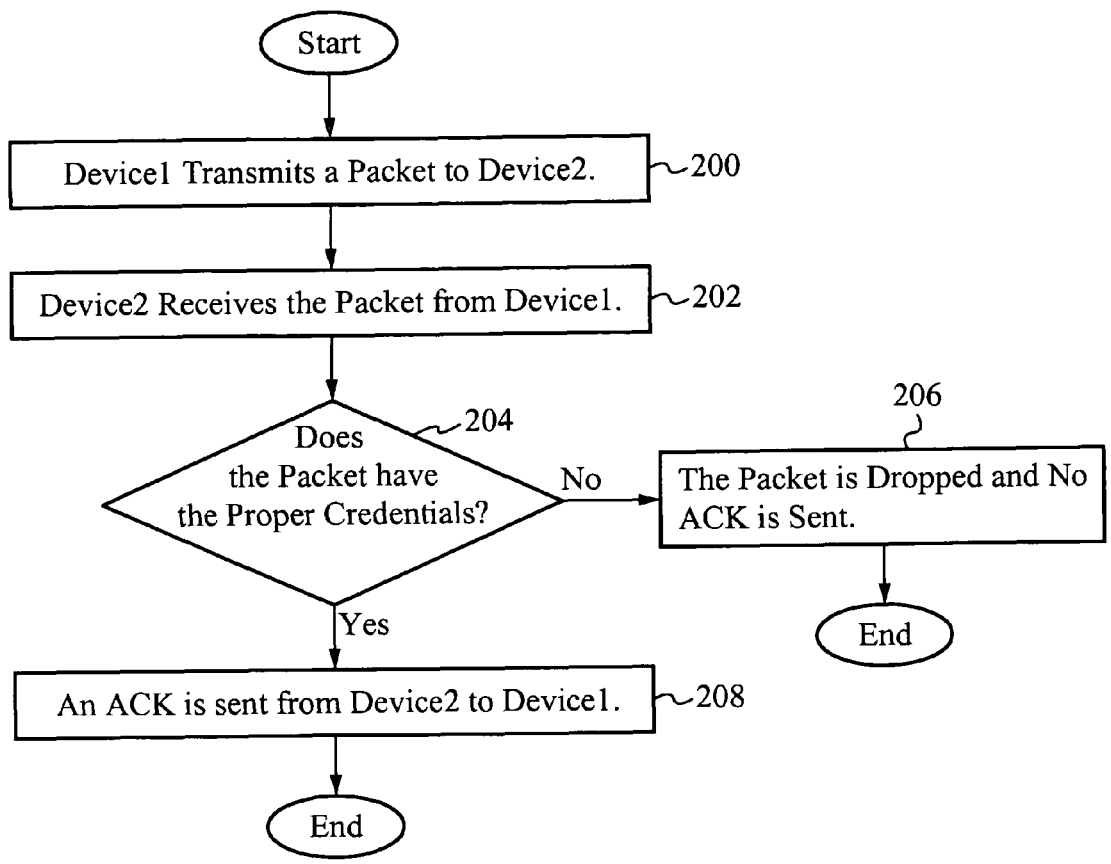
FIG. 2 illustrates a flow chart of the preferred embodiment of the present invention.

FIG. 2 illustrates a flow chart of the preferred embodiment of the present invention. In the step 200, a device of the one or more first devices 102 transmits a packet 106 to a device of the one or more second devices 104. In the step 202, the device of the one or more second devices 104 receives the packet 106. In the step 204, the device 106 of the one or more second devices 104 determines if the packet 106 has the proper credentials. Proper credentials are able to be included as a specific key, code, signature or other appropriate verification device. Furthermore, the credentials are stored in a header, wrapper or other location to accompany the packet. In some embodiments, the set of credentials are encrypted. If the packet 106 does not have the proper credentials, the packet 106 is dropped and no acknowledgment is sent back to the device of the one or more first devices 102, in the step 206. If the packet 106 does have the proper credentials, then an acknowledgment 114 is sent back to the device of the one or more first devices 102, in the step 208. By utilizing an implementation such as this, hackers' net scans will produce no results, as the devices will not respond, thus giving no indication that the device is even there.

Figure 3:
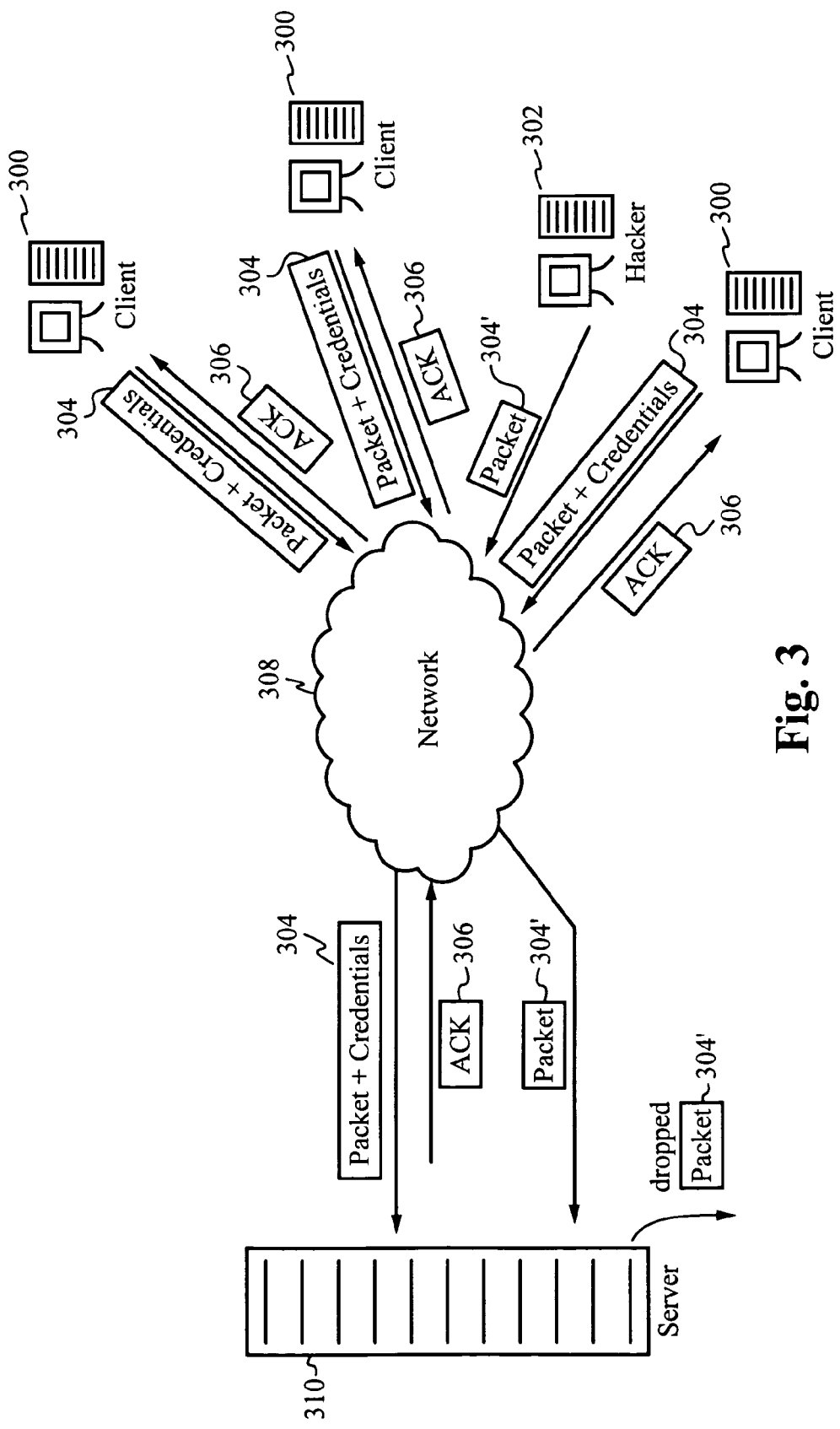
FIG. 3 illustrates a network of devices implementing the preferred embodiment of the present invention.

FIG. 3 illustrates a network of devices implementing the present invention. One or more client devices 300 are coupled to a server 310 through a network 308. The one or more client devices 300 initiate communication with the server 310 by sending a packet 304 with credentials. The server validates the credentials and then responds by sending an acknowledgment 306 back to the appropriate client device 300. If a hacker 302 attempts to communicate with the server 310 by sending a packet 304' with either the incorrect credentials or no credentials, the server receives the packet 304' but then drops the packet 304'. The server does not respond to the hacker 302. Thus, only properly authenticated clients 300 with correct credentials are able to communicate with the server 310 and hackers 302 are not. In an alternate embodiment, a server sends the packet with credentials to a client device.

Figure 4A:
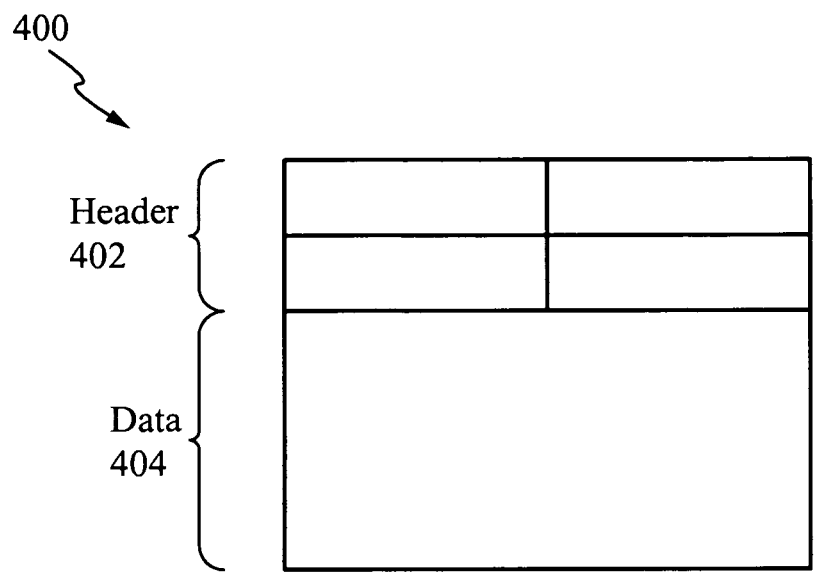
FIG. 4A illustrates a User Datagram Protocol packet.

FIG. 4A illustrates a UDP packet 400. Within a header 402 of the UDP packet 400 are four 16 bit fields including a source port, destination port, length and checksum. A data portion 404 of the packet contains the data to be transmitted.

Figure 4B:
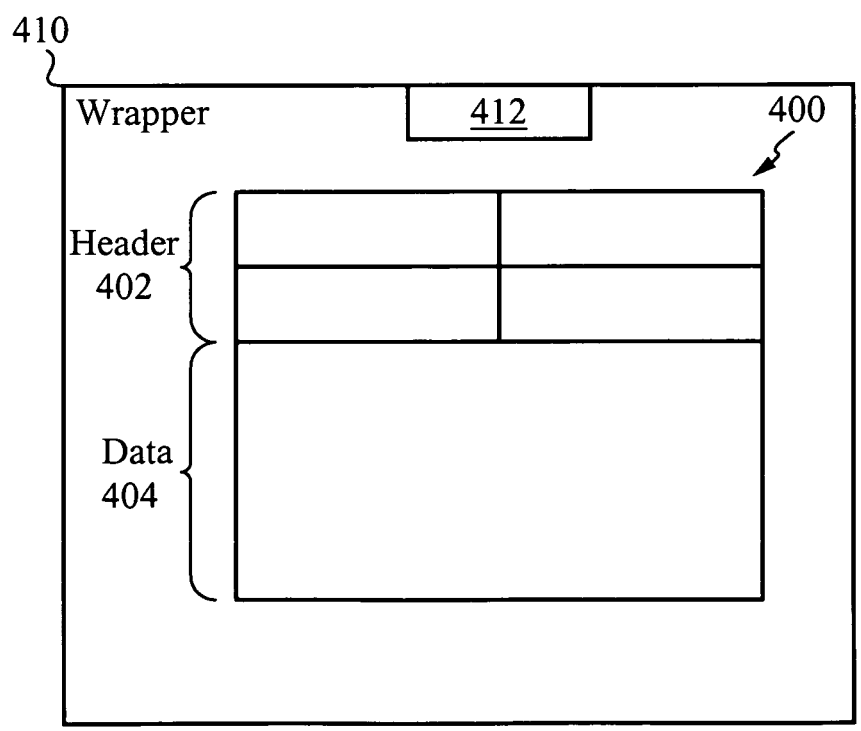
FIG. 4B illustrates a User Datagram Protocol packet within a wrapper.

FIG. 4B illustrates the UDP packet within a wrapper 410. The wrapper 410 is formatted appropriately to contain the necessary components including any additional credentials such as a signature, a key or a code. Furthermore, the wrapper 410 is able to have a wrapper header 412 where the credentials are able to be stored. The credentials necessary to verify a valid incoming packet are located within the wrapper header 412 in some embodiments or within the wrapper 410 elsewhere in other embodiments.

To utilize the present invention a network of devices is configured so that only properly authenticated devices are able to communicate with devices on the network. A transmitting device sends a packet with credentials to a receiving device. If the credentials are valid, the receiving device responds with an acknowledgment similar to that in TCP so that other communications are possible. If the credentials are not valid or if a packet does not have credentials, then the packet is dropped. This aspect is similar to UDP and unlike TCP which always responds with an acknowledgment. By only responding to authorized users, the system is able to remain undetected by unauthorized users such as hackers. After a connection is established, the devices communicate as typical network devices do, allowing the transfer of data from device to device over and through networks.

In operation the present invention performs very similarly to standard networks that implement TCP with the exception that unauthorized packets are dropped. For authorized users, standard operations are available with the network such that users of an intranet are able to print to network printers, share data across computers and access applications from servers. In some embodiments, the network is the Internet. Many other typical network operations are possible with the present invention aside from those that require access to a device without valid credentials.

The devices that are able to implement the present invention include, but are not limited to laptops, personal computers, Apple computers, handhelds, servers, thin clients and cell phones.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of increasing network security comprising:
   a. transmitting an initial packet from a first device to a second device;
   b. receiving the initial packet at the second device from the first device;
   c. verifying the initial packet has proper credentials, wherein the credentials are selected from the group consisting of a key, a code and a signature;
   d. sending an acknowledgment from the second device to the first device only if the proper credentials are verified, wherein the credentials are not required to construct the acknowledgment; and
   e. transmitting one or more subsequent packets from the first device to the second device without verifying the subsequent packets have proper credentials;
wherein the verification of the initial packet is performed independent of whether a device identifier or a user identifier of the first device is recognized by the second device, and further wherein the credentials are verified at the second device and stored within a wrapper header.

2. The method as claimed in claim 1 wherein the first device is a client and the second device is a server.

3. The method as claimed in claim 1 wherein the first device is a server and the second device is a client.

4. The method as claimed in claim 1 further comprising dropping the initial packet if the proper credentials are not verified.

5. The method as claimed in claim 1 wherein a protocol for receiving the initial packet is User Datagram Protocol or any functionally equivalent protocol.

6. The method as claimed in claim 1 wherein a protocol for sending an acknowledgment is Transmission Control Protocol or any functionally equivalent protocol.

7. The method as claimed in claim 1 wherein the first device and the second device are coupled by a network.

8. The method as claimed in claim 7 wherein the network is the Internet.

9. The method as claimed in claim 7 wherein the network is an intranet.

10. A method of increasing network security comprising:
    a. transmitting an initial packet from a first device to a second device;
    b. receiving the initial packet at the second device from the first device;
    c. verifying the initial packet has proper credentials, wherein the credentials are selected from the group consisting of a key, a code and a signature;
    d. sending an acknowledgment from the second device to the first device only if the proper credentials are verified, wherein the credentials are not required to construct the acknowledgment, further wherein the credentials are verified at the second device, and further wherein the credentials are stored within a wrapper header;
    e. dropping the initial packet if the proper credentials are not verified; and
    f. transmitting one or more subsequent packets from the first device to the second device without verifying the subsequent packets have proper credentials;
wherein the verification of the initial packet is performed independent of whether device identifier or a user identifier of the first device is recognized by the second device.

11. The method as claimed in claim 10 wherein the first device is a client and the second device is a server.

12. The method as claimed in claim 10 wherein the first device is a server and the second device is a client.

13. The method as claimed in claim 10 wherein a protocol for receiving the initial packet is User Datagram Protocol or any functionally equivalent protocol.

14. The method as claimed in claim 10 wherein a protocol for sending an acknowledgment is Transmission Control Protocol or any functionally equivalent protocol.

15. The method as claimed in claim 10 wherein the first device and the second device are coupled by a network.

16. The method as claimed in claim 15 wherein the network is the Internet.

17. The method as claimed in claim 15 wherein the network is an intranet.

18. A system for increasing network security comprising:
    a. one or more first devices for transmitting an initial packet and one or more subsequent packets;
    b. one or more second devices for receiving the initial packet and one or more subsequent packets, wherein the one or more second devices are coupled to the one or more first devices through a network; and
    c. a set of credentials within the initial packet for verification, wherein the one or more second devices send an acknowledgment back to the one or more first devices only if the set of credentials are verified, wherein the credentials are not required to construct the acknowledgment, wherein the credentials are verified at the one or more second devices, wherein the set of credentials are selected from the group consisting of a key, a code and a signature, and further wherein the credentials are stored within a wrapper header;
wherein the verification of the initial packet is performed independent of whether a device identifier or a user identifier of each of the first devices is recognized by the second devices, and further wherein the first devices transmit and the second devices receive the subsequent packets without verifying the subsequent packets have proper credentials if the acknowledgment is received.

19. The system as claimed in claim 18 wherein the first device is a client and the second device is a server.

20. The system as claimed in claim 18 wherein the first device is a server and the second device is a client.

21. The system as claimed in claim 18 wherein the one or more second devices drop the initial packet if the set of credentials are not verified.

22. The system as claimed in claim 18 wherein a protocol for receiving the initial packet is User Datagram Protocol or any functionally equivalent protocol.

23. The system as claimed in claim 18 wherein a protocol for sending an acknowledgment is Transmission Control Protocol or any functionally equivalent protocol.

24. The system as claimed in claim 18 wherein the network is the Internet.

25. The system as claimed in claim 18 wherein the network is an intranet.

26. A network of devices for increasing network security comprising:
    a. one or more client devices for transmitting an initial packet and one or more subsequent packets;

b. one or more server devices for receiving the initial packet and the subsequent packets, wherein the one or more server devices are coupled to the one or more client devices through a network; and c. a set of credentials within the initial packet for verification, wherein the one or more server devices send an acknowledgment back to the one or more client devices only if the set of credentials are verified, wherein the credentials are not required to construct the acknowledgment, wherein the set of credentials are verified at the one or more server devices, wherein the set of credentials are selected from the group consisting of a key, a code and a signature, and further wherein the credentials are stored within a wrapper header;

wherein the verification of the initial packet is performed independent of whether a device identifier or a user identifier of each of the client devices is recognized by the server devices, and further wherein the client devices transmit and the server devices receive the subsequent packets without verifying the subsequent packets have proper credentials if the acknowledgment is received.

27. The network of devices as claimed in claim 26 wherein the one or more server devices drop the initial packet if the set of credentials are not verified.

28. The network of devices as claimed in claim 26 wherein a protocol for receiving the initial packet is User Datagram Protocol or any functionally equivalent protocol.

29. The network of devices as claimed in claim 26 wherein a protocol for sending an acknowledgment is Transmission Control Protocol or any functionally equivalent protocol.

30. The network of devices as claimed in claim 26 wherein the network is the Internet.

31. The network of devices as claimed in claim 26 wherein the network is an intranet.

32. An apparatus comprising a memory device, the memory device comprising:

a. an initial packet for increasing network security, the initial packet comprising:
i. data; and
ii. a set of credentials,
wherein the set of credentials are analyzed by a receiving device such that the receiving device sends an acknowledgment back and receives one or more subsequent packets without verifying the subsequent packets have proper credentials only if the set of credentials are valid, wherein the credentials are not required to construct the acknowledgment, wherein the set of credentials are selected from the group consisting of a key, a code and a signature and are stored within a wrapper header, and further wherein the apparatus is configured to transmit the initial packet to the receiving device independent of whether a device identifier or a user identifier of the receiving device is recognized by the apparatus.

33. The packet as claimed in claim 32 wherein the set of credentials are stored within a header.

34. The packet as claimed in claim 32 wherein the set of credentials are stored within a wrapper.

35. The packet as claimed in claim 32 wherein the set of credentials are encrypted.

36. The packet as claimed in claim 32 wherein the initial packet is a User Datagram Protocol packet or a functionally equivalent protocol packet.

37. A method of increasing network security comprising:

a. transmitting an initial packet from a first device to a second device;

b. receiving the initial packet at the second device from the first device using a User Datagram Protocol;

c. verifying the initial packet has proper credentials, wherein the credentials are selected from the group consisting of a key, a code and a signature;

d. sending an acknowledgment from the second device to the first device only if the proper credentials are verified; and e. transmitting one or more subsequent packets from the first device to the second device without verifying the subsequent packets have proper credentials;

wherein the verification of the initial packet is performed independent of whether a device identifier or a user identifier of the first device is recognized by the second device, and further wherein the initial packet comprises a packet header and a wrapper with a wrapper header, and the credentials are stored within the wrapper header.

* * * * *